United States Patent
Olsen, III et al.

(10) Patent No.: US 7,379,805 B2
(45) Date of Patent: May 27, 2008

(54) WIRELESSLY ENABLED TRAILER LOCKING/UNLOCKING

(75) Inventors: John A. Olsen, III, Cumming, GA (US); David L. Bradley, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 722 days.

(21) Appl. No.: 10/891,414

(22) Filed: Jul. 14, 2004

(65) Prior Publication Data

US 2006/0015233 A1    Jan. 19, 2006

(51) Int. Cl.
    *G06F 7/70* (2006.01)
(52) U.S. Cl. ............................. 701/50; 701/36; 701/300
(58) Field of Classification Search ................... 701/36, 701/50, 300, 301; 70/257, 282
    See application file for complete search history.

(56) References Cited

U.S. PATENT DOCUMENTS

| | | | |
|---|---|---|---|
| 5,532,521 A | * | 7/1996 | Leininger ................... 307/10.2 |
| 2003/0003777 A1 | | 1/2003 | Lesesky et al. |
| 2003/0060938 A1 | | 3/2003 | Duvall |
| 2003/0120522 A1 | | 6/2003 | Uyeki |
| 2003/0190911 A1 | | 10/2003 | Hirano |
| 2003/0204407 A1 | | 10/2003 | Nabors et al. |
| 2004/0055345 A1 | | 3/2004 | Moore |
| 2004/0102896 A1 | | 5/2004 | Thayer et al. |

FOREIGN PATENT DOCUMENTS

EP    1 182 154 A1    2/2002

JP    01 214504 A    11/1989

OTHER PUBLICATIONS

International Search Report from corresponding International Application No. PCT/US05/024743 dated Jan. 10, 2006.
Mitsui Zosen Syst Giken KK, "Container Managing System," Patent Abstracts of Japan, Aug. 28, 1989, vol. 013, No. 526 (M-897), Japan.
International Search Report from corresponding International Application No. PCT/US05/024743 dated Dec. 7, 2005.
Kathleen Hickey, Insecurity Over E-Seals, trafficWorld, Jan. 19, 2004.
A Truly Global Tracking System with True Security, All Set Wireless Tracking, Accessed Feb. 2004, p. 1, http://www.allset.se/tracking/solutions.overview.asp. Applicants make no admission that this reference constitutes prior art.

(Continued)

*Primary Examiner*—Richard M. Camby
(74) *Attorney, Agent, or Firm*—Alston & Bird LLP

(57) ABSTRACT

A method and system for providing improved handling of tractors and trailers (or any powered vehicle and storage devices towed thereby) with a staging area. One invention relates to the provision of automatic locking or unlocking of a trailer door when the trailer leaves or enters the hub, respectively. A RFID signal strength evaluation scheme is also provided, which monitors successful RFID-to-antennae communications under various weather conditions, in order to determine an optimum read process.

Under another embodiment, Geofencing and/or Wi-Fi can be used to trigger various events.

12 Claims, 5 Drawing Sheets

OTHER PUBLICATIONS

All Set Tracking Launches a New Revolutionary Electronic Seal, All Set Marine Security, Accessed in Oct. 2004, Dated Sep. 17, 2002, p. 1, http://www.allset.se/security/news/Articles/default.asp?articleID=14. Applicants make no admission that this reference constitutes prior art.
We Make Electronic Sealing Easy and Economical, All Set Wireless Tracking, Accessed in Feb. 2004, pp. 1-2, http://www.allset.se/tracking/solutions/products.asp. Applicants make no admission that this reference constitutes prior art.
Keep Track of Your Containers, All Set Wireless Tracking, Accessed in Feb. 2004, p. 1-3, http://www.allset.se/tracking/solutions/scenarios.asp. Applicants make no admission that this reference constitutes prior art.
Elementary Solutions For a Moving World, All Set Wireless Tracking, Accessed in February., p. 1, http://www.allset.se/tracking/. Applicants make no admission that this reference constitutes prior art.
All Set System Installed Onboard RoRo Ship, All Set Wireless Tracking, Accessed in Feb. 2004, Dated May 26, 2003, p. 1, http://www.allset.se/tracking/news/Articles/default.asp?articleID=19. Applicants make no admission that this reference constitutes prior art.
CIMC and All Set in "Smart and Secure Container" Alliance, All Set Wireless Tracking, Accessed in Feb. 2004, Dated Apr. 4, 2003 pp. 1-2, http://www.allset.se/tracking/news/Articles/default.asp?articleID=16. Applicants make no admission that this reference constitutes prior art.
Cargo Container With Smart Systems Alerts Global Network in Real Time About Security Breaches and In-the-Box Changes, News/Events: Press Releases, Accessed Feb. 2004, pp. 1-4, http://www.savi.com/news_events/2003releases/oct29-03.a.html, Applicants make no admission that this reference constitutes prior art.
Savi Solutions, Savi Technology, Accessed Feb. 2004, p. 1, http://www.savi.com/solutions/index.html. Applicants make no admission that this reference constitutes prior art.
Savi Search, Savi Technology, Accessed Feb. 2004, pp. 1-2, http://www.savi.com/cgi-bin/sitesearch/search_savi.cgi. Applicants make no admission that this reference constitutes prior art.
Savi Technology Launches SmartSeal™ Cargo Security System, News/Events: Press Releases, Accessed Feb. 2004, pp. 1-2, http://www.savi.com/news_events/2001releases/oct03-01.html. Applicants make no admission that this reference constitutes prior art.
About Hi-G-Tek, Hi-G-Tek, Accessed Feb. 2004, pp. 1-2, http://www.higtek.com/company.htm. Applicants make no admission that this reference constitutes prior art.
Secured Cargo, Hi-G-Tek, Accessed Feb. 2004, pp. 1-4, http://www.higtek.com/cargo.htm. Applicants make no admission that this reference constitutes prior art.
Hi-G-Tek Diamond are Forever, Hi-G-Tek, Accessed Feb. 2004, p. 1, http://www.higtek.com/images/article.gif. Applicants make no admission that this reference constitutes prior art.
Our Business, Elogicity, Accessed Feb. 2004, p. 1, http://www.elogicity.com/about_us.htm. Applicants make no admission that this reference constitues prior art.
Solutions, Elogicity, Accessed Feb. 2004, p. 1, http://www.elogicity.com/solutions.htm. Applicants make no admission that this reference constitutes prior art.
Cargo Security Your Source for Supply Chain Cargo Security Products, CGM Security Solutions, Accessed Feb. 2004, pp. 1-2, http://www.cgmsecuritysolutions.com/sw/swchannel/homepage/internet/schomepage.asp?.... Applicants make no admission that this reference constitues prior art.
Our Products, CGM Security Solutions, Accessed Feb. 2004, pp. 1-4, http://www.cgmsecuritysolutions.com/sw/swchannel/productcatalogcf_v2/internet/Product... Applicants make no admission that this reference constitutes prior art.
Warehouse Operations Committee (Agenda), IARW, Jul. 27, 2003, 44 Pages. Applicants make no admission that this reference constitutes prior art.
Freight Containers—Radio-Frequency Communication Protocol for Electronic Seal, ISO Document, Sep. 27, 2003, 23 Pages, Geneva, Switzerland. Applicants make no admission that this reference constitutes prior art.
U.S. Treasury Advisory Committee on Commercial Operations of the United States Customs Service (COAC) Subcommittee on US Border Security Technical Advisory Group & Customs Trade Partnership Against Terrorism (C-TPAT), Report on Seal Technologies, Jun. 14, 2002, 37 pages, vol. 7, Scott Smith, Harrison Consulting Group, LLC, National Cargo Security Council. Applicants make no admission that this reference constitutes prior art.

* cited by examiner (NOT TO SCALE)

WIRELESSLY ENABLED TRAILER LOCKING/UNLOCKING

BACKGROUND OF THE INVENTION

1. Field of the Invention

The present invention relates generally to coordinating activities associated with the movement of vehicles into and out of a staging area, and more particularly, to systems and associated methods for automating vehicle inventory and dispatch procedures at such a location.

2. Description of Related Art

Within a transportation network, staging areas play a critical role in attempting to ensure that goods are transported throughout the transportation network in an efficient and reliable manner. As used herein, a "staging area" can be defined as any processing or exchange point within a transportation network, including, but not limited to, a delivery hub, a vehicle exchange point, a rail yard, an air terminal, a shipping port, or any other such point through which delivery vehicles and cargo containers pass. An important aspect of ensuring that a staging area itself operates in an efficient and reliable manner is the need to have systems and methods in place for coordinating the flow of vehicles that haul such goods to and from the staging area on a daily basis.

For example, when a delivery truck arrives at a hub location, the driver of the vehicle preferably needs to be aware of certain information, such as where to drop off the inbound load which he or she is transporting. Typically, the delivery driver also needs to be informed as to whether or not he or she will subsequently be transporting a new, outbound load. If the driver is assigned a new, outbound load, he or she must be given information on how to identify and locate the particular load within the delivery hub, and on where to go with the load after leaving the hub. In the case of a rail yard, the delivery vehicle may be a train that includes a plurality of freight cars in which each freight car contains one or more shipping containers. When the train arrives at the rail yard, some or all of the containers may need to be removed from the train and placed in particular locations within the yard. Meanwhile, other containers already residing in the rail yard may need to be loaded onto the train so that they can be shipped to a new location.

Yet another example can include an air terminal where various types of delivery vehicles are used to pull "trains" of "igloos" (or air containers) into and out of a staging area so that such containers can be loaded onto and off of airplanes. In the case of containers coming into the staging area, dispatch personnel (or systems) would typically need to have methods of determining such things as when such containers arrive at the staging area and where each such container is going.

To ensure that these and other such events occur in an organized and systematic fashion, shipping companies such as UPS® have developed various methods for managing the flow of vehicles at staging areas within a transportation network. For example, one prior art method of coordinating events at a delivery hub (or other staging area) involves having a call box or telephone positioned at least one of the gates associated with the delivery hub (or other staging area). When a delivery truck arrives at the hub (or other staging area), the driver is expected to use the call box to manually call a dispatch center for instructions on how to proceed. The dispatch center is responsible for providing the driver, via the call box, with the type of information mentioned above, such as where to drop off an inbound load, where or how to locate the driver's next outbound load, and where to go with an outbound load after leaving the hub (or other staging area). One problem with this method is that the process frequently takes as long as fifteen to twenty minutes for each delivery vehicle. In many cases the waiting time for each vehicle is effectively doubled because a similar process is required for all outbound vehicles.

Another problem that presently occurs at delivery hubs (or other staging area(s)) is that drivers frequently pull out and leave with the wrong outbound loads. In the current operating environment, unique vehicle identification numbers are typically associated with each delivery vehicle and with each trailer (or container placed on/in a trailer, rail car, airplane, etc.) operating within a transportation network. According to one prior art method, each vehicle identification number is displayed in a human-readable format on a label affixed to an outer surface of each such vehicle (or container). By receiving a vehicle identification number from the dispatch center at the hub (or other staging area), a delivery driver is able to identify the particular outbound trailer (or other vehicle) that the driver is assigned to leave with. When the driver locates a trailer that appears to contain the correct vehicle identification number, the driver pulls the trailer and exits the delivery hub (or other staging area).

Another time-consuming event in the currently known art relates to dealing with a door seal attached to the rear door of the trailers. Preferably, these seals discourage unauthorized entry into the trailer when the trailer is outside the hub (or other staging area). Under one version of the currently known prior art, the tractor/trailer operator (a.k.a. the "driver") must stop at an inbound gate and check in with a designated individual, who then cuts the door seal on the vehicle. The process takes anywhere between 7 and 15 minutes. A similar delay can be encountered when a fresh seal is placed on the door of an outbound trailer.

Therefore, a need exists for an improved system and method of coordinating the activities associated with the flow of vehicles at a delivery hub or other staging area that allows for expedited dispatch procedures.

BRIEF SUMMARY OF THE INVENTION

The present invention overcomes deficiencies in the prior art.

Generally described, the present invention is directed toward a method for automating inbound tractor/trailer exchange procedures at a staging area, in which drivers drive tractors pulling detachable trailers in and out of the hub, the trailers having rear doors configured to open and close, the trailers also having locks configured to be selectively lock or unlocked in order to respectively secure or release the rear doors relative to a predetermined position, the method comprising the steps of: reading a first identifier stored on a first radio-frequency identification (RFID) tag that is physically associated with a tractor, the tractor being inbound to the staging area and being driven by a driver; reading a second identifier stored on a second radio-frequency identification (RFID) tag that is physically associated with a trailer, the trailer being pulled by the tractor; sending the first and second identifiers along a first communication link to an information management system; transmitting information along a second communications link from the information management system to the driver's terminal, the terminal being within the tractor accessible to the driver; and wirelessly transmitting information along a third communications link from the driver's terminal to a locking device configured to selectively lock the rear door of the trailer, such that the locking device can be selectively unlocked.

The invention is also directed towards method for automating inbound tractor/trailer exchange procedures at a staging area, in which drivers drive tractors pulling detachable trailers in and out of the hub, the trailers having rear doors configured to open and close, the trailers also having locks configured to be selectively lock or unlocked in order to respectively secure or release the rear doors relative to a predetermined position, the method including the steps of: reading a first identifier stored on a first radio-frequency identification (RFID) tag that is physically associated with a tractor, the tractor being inbound to the staging area and being driven by a driver; reading a second identifier stored on a second radio-frequency identification (RFID) tag that is physically associated with a trailer, the trailer being pulled by the tractor; sending the first and second identifiers along a first communication link to an information management system; confirming that the first and second identifiers satisfy a preestablished relationship; pursuant to the confirmation above, transmitting information along a second communications link from the information management system to the driver's terminal, the terminal being within the tractor accessible to the driver; wirelessly transmitting information along a third communications link from the driver's terminal to a locking device configured to selectively lock the rear door of the trailer, such that the locking device can be selectively unlocked.

The invention is also directed towards a method for automating outbound tractor/trailer exchange procedures at a staging area, in which drivers drive tractors pulling detachable trailers in and out of the staging area, the method comprising the steps of: reading a first identifier stored on a first radio-frequency identification (RFID) tag that is physically associated with a tractor, the tractor being driven by a driver and outbound from the staging area; reading a second identifier stored on a second radio-frequency identification (RFID) tag that is physically associated with a trailer, the trailer being pulled by the tractor; sending the first and second identifier along a first communication link to an information management system; transmitting information along a second communications link from the information management system to the driver's terminal, the terminal being within the tractor and accessible to the driver; wirelessly transmitting information along a third communications link from the driver's terminal to a locking device configured to selectively lock the rear door of the trailer.

The invention is also directed towards a method for automating outbound tractor/trailer exchange procedures at a staging area, in which drivers drive tractors pulling detachable trailers in and out of the staging area, the method comprising the steps of: reading a first identifier stored on a first radio-frequency identification (RFID) tag that is physically associated with a tractor, the tractor being driven by a driver and outbound from the staging area; reading a second identifier stored on a second radio-frequency identification (RFID) tag that is physically associated with a trailer, the trailer being pulled by the tractor; sending the first and second identifier along a first communication link to an information management system; confirming that the first and second identifiers satisfy a preestablished relationship; pursuant to the confirmation above, transmitting information along a second communications link from the information management system to the driver's terminal, the terminal being within the tractor and accessible to the driver; and wirelessly transmitting information along a third communications link from the driver's terminal to a locking device configured to selectively lock the rear door of the trailer.

The invention is also directed towards a method for automating inbound and outbound tractor/trailer exchange procedures at a staging area having at least one wireless access point, in which drivers, having driver's terminals, drive tractors pulling detachable trailers in and out of the staging area, the trailers having at least one wirelessly operated locking device for locking a rear door of the trailer, the method comprising the steps of: establishing in outermost geofence, and intermediate geofence, and an innermost geofence, the geofences readable by a driver's terminal; upon the crossing of the outermost geofence by the driver's terminal, sending a first signal from the driver's terminal to the staging area wireless access point; pursuant to the reciept of the first signal, creating a driver's dispatch including instructions for the driver upon arrival at the staging area; upon the crossing of the intermediate geofence by the driver's terminal, sending a second signal from the driver's terminal to the staging area wireless access point; pursuant to the reciept of the first signal, sending the driver's dispatch to the driver's terminal; upon the crossing of the innermost geofence by the driver's terminal, and sending a third signal from the driver's terminal to the locking device such that the locking device is unlocked.

The invention is also directed towards a method for automating inbound and outbound tractor/trailer exchange procedures at a staging area having at least one wireless access point, in which drivers, having driver's terminals, drive tractors pulling detachable trailers in and out of the staging area, the trailers having at least one wirelessly operated locking device for locking a rear door of the trailer, the method comprising the steps of: establishing an outermost Wi-Fi boundary, and intermediate Wi-Fi boundary, and an innermost Wi-Fi boundary, the Wi-Fi boundary readable by a driver's terminal; upon the crossing of the outermost Wi-Fi boundary by the driver's terminal, sending a first signal from the driver's terminal to the staging area wireless access point; pursuant to the reciept of the first signal, creating a driver's dispatch including instructions for the driver upon arrival at the staging area; upon the crossing of the intermediate Wi-Fi boundary by the driver's terminal, sending a second signal from the driver's terminal to the staging area wireless access point; pursuant to the reciept of the first signal, sending the driver's dispatch to the driver's terminal; and upon the crossing of the innermost Wi-Fi boundary by the driver's terminal, sending a third signal from the driver's terminal to the locking device such that the locking device is unlocked.

The invention is also directed towards a method of testing RFID capture on vehicles in an environment, comprising the steps of: A) monitoring weather characteristics of the environment; B) monitoring the capture of data from an RFID device to a RFID reader; C) recording a video record of a plurality of attempts to capture information from the RFID device to the reader; and D) using the test results of steps A, B, and c to evaluate RFID capture for a variety of weather conditions and vehicle characteristics.

BRIEF DESCRIPTION OF THE SEVERAL
VIEWS OF THE DRAWING(S)

Having thus described the invention in general terms, reference will now be made to the accompanying drawings, which are not necessarily drawn to scale, and wherein:

Figure 5:
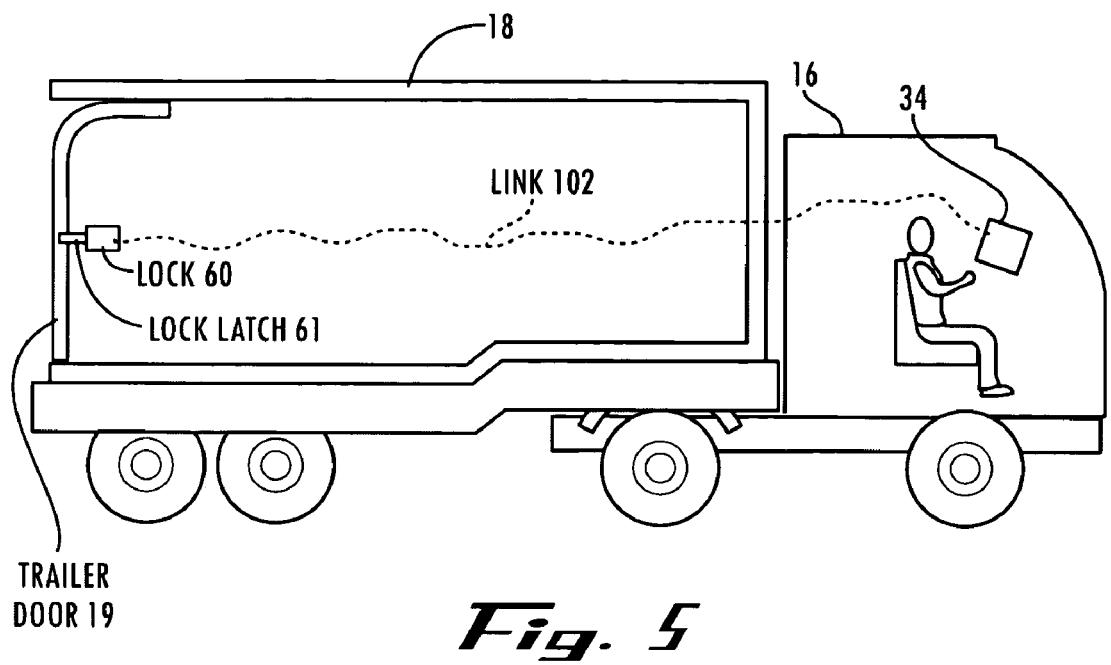

FIG. 5 is an illustrative view of a typical trailer 18 having a typical rear overhead trailer door 19, which is located by a selectively engagable locking device 60 having a lock latch 61.

Figure 6:
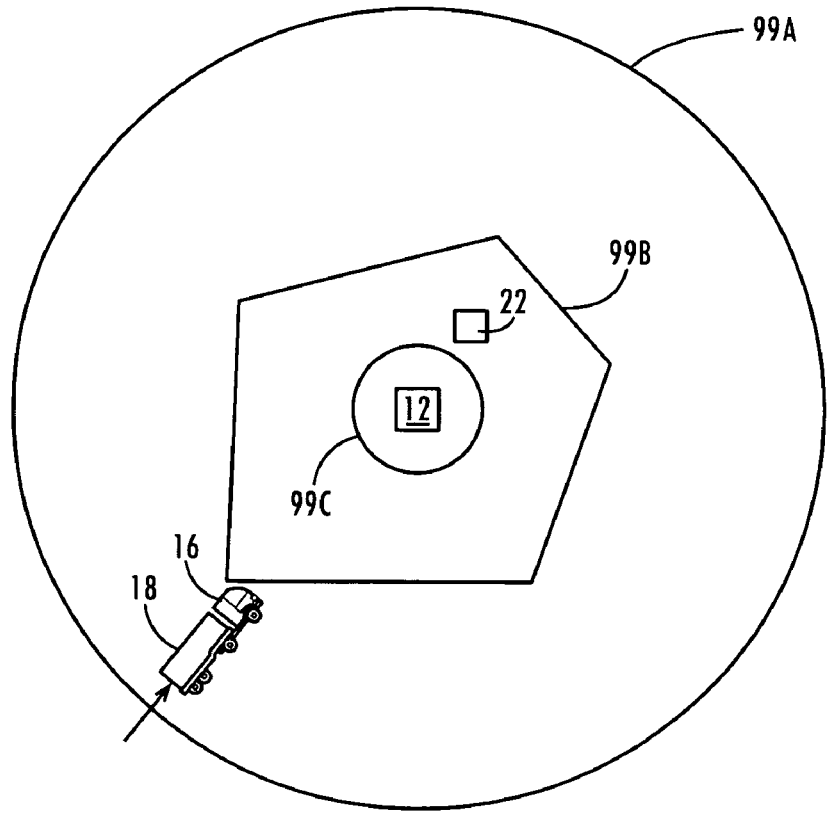

FIG. 6 is an illustrative view of a vehicle inventory and dispatch system that includes a "geofencing" feature in accordance with an embodiment of the present invention. Shown are three geofences, an outermost geofence 99A, an intermediate geofence 99B, and an innermost geofence 99C. Inside or at least proximate the innermost geofence 99C are a staging area 12 and an information management system 22.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Radio Frequency Identification Technology

A technology known as radio frequency identification technology (RFID) uses radio waves rather than optics to capture and transmit data. RFID is basically a form of labeling where electronic labels or tags are programmed with unique information and attached to objects to be identified or tracked. In RFID, electronic chips are used to store data that can be broadcast via radio waves to a reader, eliminating the need for a direct line of sight and making it possible for tags to be placed in a variety of places on or in an object, such as a vehicle. Additional benefits of RFID are the greater data storage capacity of the RFID tag in comparison to the barcode and the decreased likelihood that the RFID tag will be destroyed or otherwise made unreadable.

A typical RFID system consists of a reader, a tag and a data processing system to process the data read from the tag. The tag also is called a transponder, an expression which is derived from TRANSmitter/resPONDER and, in some cases, the term tag is used for low-frequency (e.g. 125 kHz), whereas the term transponder is used for high-frequency (e.g. 13.56 MHz and 2.45 GHz) tags. But for purposes of this application the terms tag and transponder are used interchangeably. The complexity of the reader (sometimes referred to herein as an interrogator) can vary considerably, depending on the type of tag used and the function to be fulfilled. In general, a reader has radio circuitry to communicate with a tag, a microprocessor to check and decode the data and implement a protocol, a memory to store data and one or more antennas to receive the signal.

Unlike a barcode reader, which is limited to reading a single barcode at a time, a RFID reader may have more than one tag in its interrogation zone. The interrogation zone, as that term is used herein, refers to the area covered by the magnetic field generated by the reader's antenna. The process of reading a number of transponders within a system's interrogation zone is known as batch reading. Software applications known as anticollision algorithms exist that permit a reader to avoid data collision from several tags that enter the interrogation zone at the same time. One of three different anticollision techniques is generally implemented; these techniques are spatial, frequency and time domain procedures.

In the spatial domain technique, the reader restricts its interrogation zone in order to reduce the possibility that two different transponders fall into the area covered by the reader itself. With this technique, the number of readers needed to cover an area increases in proportion to the size of the covered area. Frequency domain procedures are based on frequency domain multiplex techniques or spread spectrum technologies. In these systems, the reader broadcasts a status of frequencies allocated to the communication with the transponders, with frequencies flagged that are currently in use by a transponder. When a new transponder accesses the reader's coverage, it uses an unoccupied frequency to transmit its data.

Time domain anticollision techniques are divided into two categories: interrogator and transponder driven procedures. In addition, interrogator driven time domain anticollision procedures can be sub-divided into polling and binary search procedures. Polling techniques make use of the fact that a unique serial number is written to each transponder at the production stage. In the polling technique, the interrogator requests all possible transponder serial numbers until a transponder with a polled serial number responds. The polling procedure is typically slow and generally is limited to processes employing small numbers of transponders. The other interrogator driven procedure is the binary search. A binary search is faster than the polling technique, and is based on search algorithms that use binary trees of transponder identifiers. In the transponder driven anticollision procedures, the transponder, rather than the interrogator, controls the data flow. In general, transponder driven procedures are based on the cyclic transmission of identifiers by transponders and are designed such that it is unlikely that any two transponders will send the same identifier at the same time.

Using RFID and other such Technology at a Staging Area such as a Delivery Hub

Figure 1:
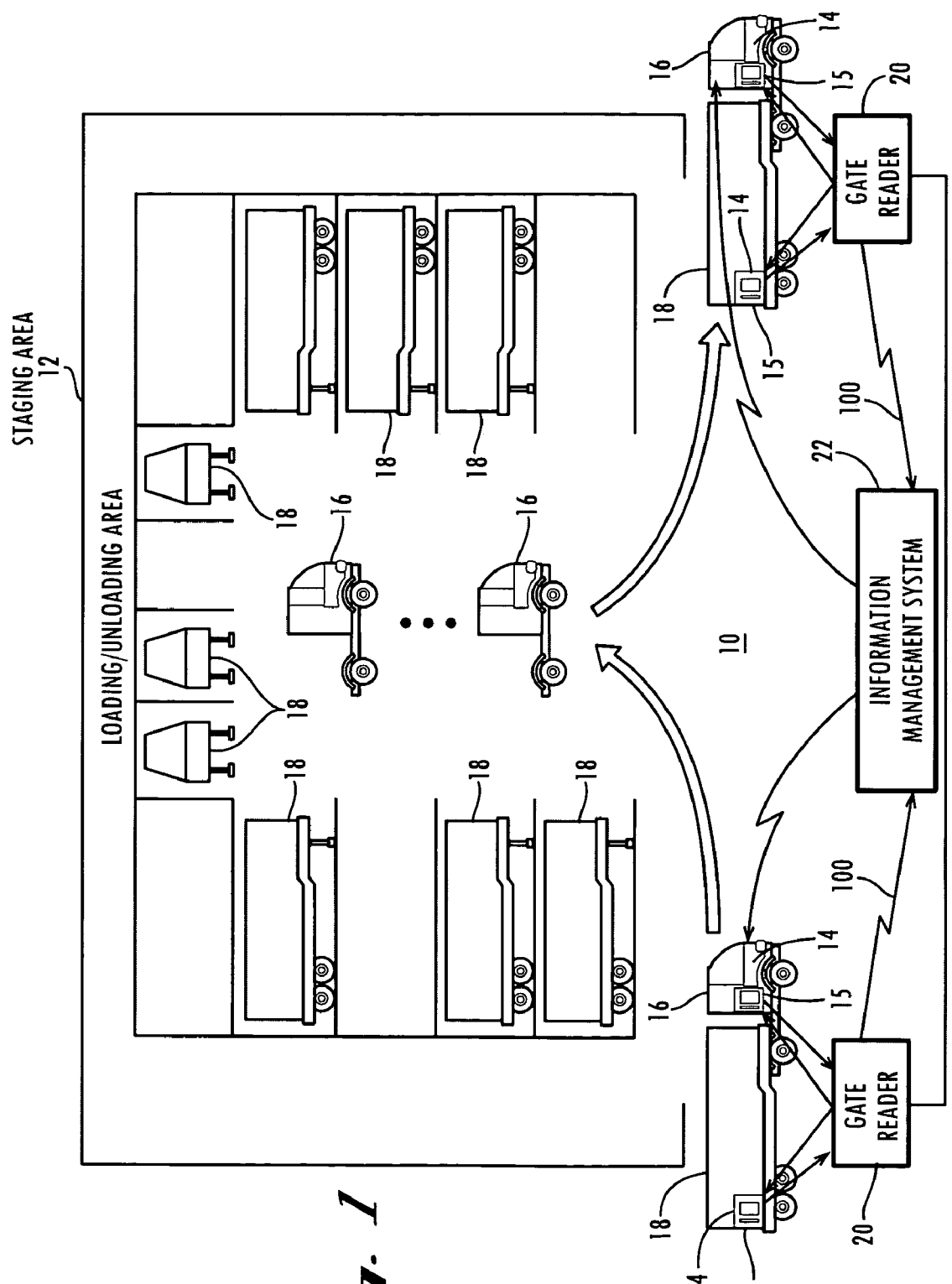
FIG. 1 illustrates a vehicle inventory and dispatch system 10 in accordance with an embodiment of the present invention.

FIG. 1 illustrates a vehicle inventory and dispatch system 10 for use at a staging area 12 in accordance with an embodiment of the present invention. The vehicle inventory and dispatch system 10 comprises identification tags 14 that are physically associated with each tractor 16, trailer 18, or other such vehicles (or with containers on such vehicles) entering or exiting the staging area 12. The system 10 further comprises one or more gate reader systems 20 for capturing information contained on (or in) each identification tag, and an information management system 22 for tracking and coordinating the flow of vehicles (or containers on such vehicles) into, and out of, the staging area 12. Each of these subsystems will be described in detail below.

Note that in the embodiment shown in FIG. 1, the staging area 12 is depicted as a type of delivery hub that would typically be used by tractor-trailer delivery trucks. As such, to clearly illustrate the detailed aspects of the present invention, the present invention is often described in the context of such a delivery hub. However, one of ordinary skill in the art will readily recognize that the systems and methods described herein are equally advantageous when applied to other staging areas involving a need for tracking and coordinating the flow of vehicles into and out of a given location, including rail yards, shipping ports, air terminals, and other such locations.

The gate reader system 20 of FIG. 1 can broadly be described as any system capable of capturing information contained on (or in) the identification tags 14, which in one preferred embodiment are associated with each vehicle (tractor 16, trailer 18, or other such vehicle or container) entering or leaving the staging area 12. The information contained on (or in) each identification tag 14 includes an identifier 15 for uniquely identifying the vehicle that it is associated with. In one embodiment, the identification tags 14 are a type of label which can be affixed to a portion of each vehicle, and which include the vehicle identifier 15 identified in a variety of formats, including having the identifier displayed in the form of human readable indicia, encoded into a bar code, and/or stored on an RFID tag embedded in the label. Preferably, each identification tag 14 includes at least an RFID tag, or other such device, that can be affixed to a portion of a vehicle (or container) from which a gate reader system 20 can automatically read the unique identifier 15 associated with the vehicle or container.

For example, in the case of a tractor-trailer combination 16, 18 as shown entering the delivery hub of FIG. 1, a first RFID tag 14 having a first identifier 15 would be physically associated with the tractor 16, and a second RFID tag 14 having a second identifier 15 would be physically associated with the trailer 18. Or, similarly, each cargo container on a train entering a rail yard, or each air container ("igloo") being brought into an air terminal, could include an RFID tag 14 having a unique identifier 15 associated with it, as could the vehicle(s) hauling such containers, for example. Yet other examples can include a combination of the above, such as a tractor-trailer combination 16, 18 entering a delivery hub 12, in which the trailer 18 contains a plurality of air containers, each such container having its own RFID tag 14, and each such container to be dispatched differently within the delivery hub. Preferably, the RFID tags 14 used in connection with the present invention are passive RFID tags operating, for example, in the frequency range of 915 MHz or 13.56 MHz. However, the selection of an RFID tag for a particular application will typically depend upon one or more of the above stated considerations regarding RFID tags and their operation.

In one embodiment, the gate reader system 20 includes an RFID interrogator capable of reading the identifier 15 stored on an RFID tag 14 that is associated with a vehicle (or container) passing within range of the RFID reader's interrogation zone. The gate reader system 20 also includes a means for communicating the captured identifier 15 to the information management system 22. In one embodiment, the identifier 15 is transmitted from the gate reader system 20 to the information management system 22 via a link 100, which can be hard-wired or wireless. This can be accomplished in a known manner by configuring the gate reader system 20 and the information management system 22 to communicate over a Wireless Local Area Network (WLAN) that operates using, for example, the 802.11 standard of wireless communication. The WLAN can also provide one of the ways by which the information management system 22 communicates with the driver of a delivery vehicle 16. In another embodiment, communication between the gate reader system 20 and the information management system 22 can occur via other wireless means, a standard telephone wire, a network cable, or other communicative means.

Figure 2:
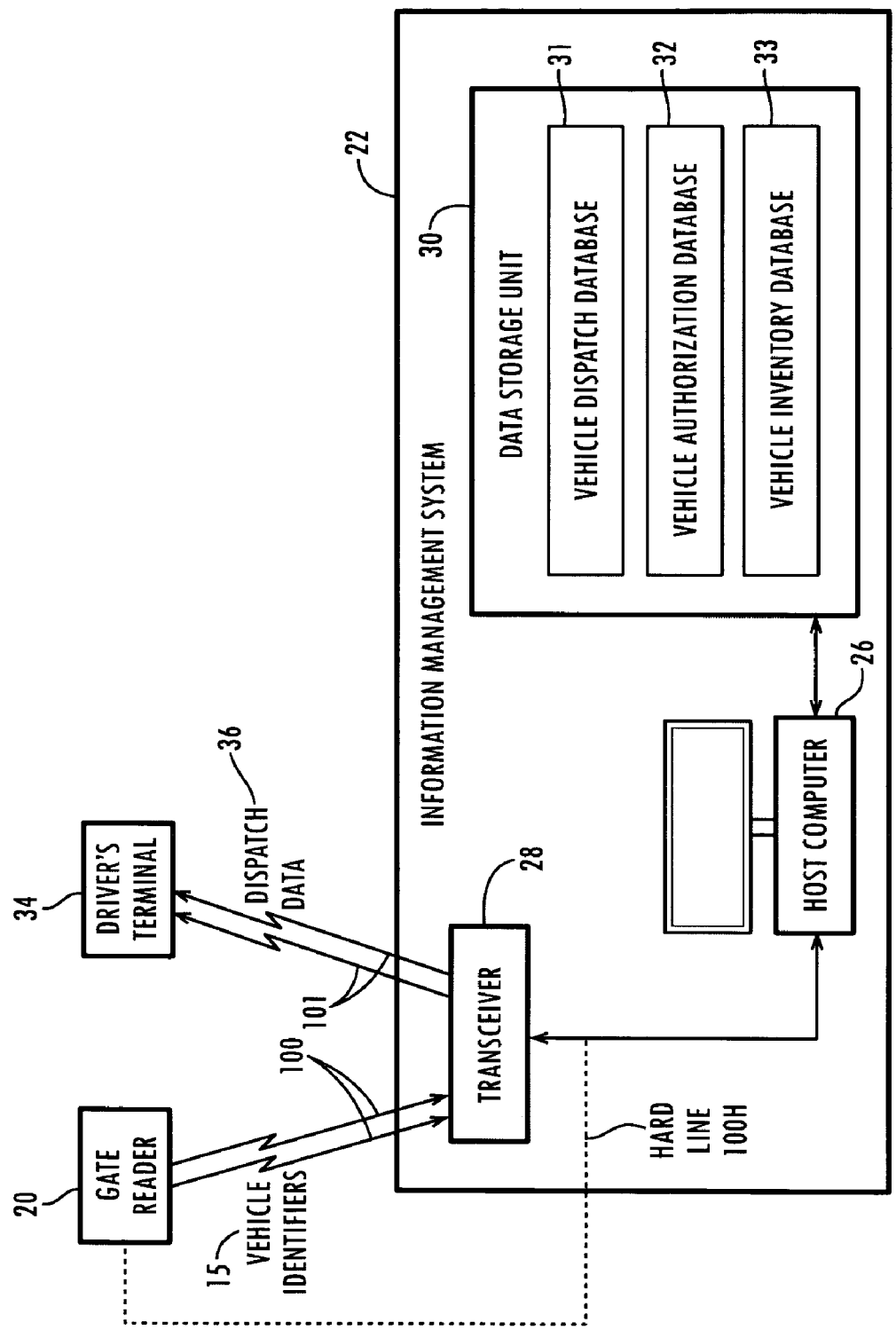
FIG. 2 illustrates an information management system in accordance with an embodiment of the present invention.

FIG. 2 illustrates an information management system 22 in accordance with an embodiment of the present invention. The information management system 22 includes a host computer 26, a transceiver 28, and a data storage unit 30. In general, the host computer 26 is used for coordinating the inventory and dispatch procedures at a staging area 12, such as the one shown in the embodiment of FIG. 1. To enable communication between the host computer 26 and the gate reader system 20, as well as other devices such as a DIAD 34 (or another suitable computer terminal) used by a delivery driver, the host computer 26 is communicatively connected to the transceiver 28. The transceiver 28 can be any known device capable of sending and receiving wireless transmissions, including 802, Bluetooth, cellular, etc.

In one embodiment, the host computer 26 communicates with the gate reader system 20 and DIADs 34 (or other computers) via the transceiver 28 over a Wireless Local Area Network (WLAN). To assist in coordinating the operations of the hub 12, the host computer 26 is programmed to perform queries, based on information received from the gate reader systems 20, of various databases contained in the data storage unit 30. The data storage unit 30 comprises a vehicle dispatch database 31, a vehicle inventory database 33, and a vehicle authorization database 32. These databases facilitate vehicle dispatching, vehicle inventory, and vehicle authorization as generally described elsewhere in this application. The functionality associated with each of these databases will be described in detail below.

Referring back to FIG. 1, it shows a portion of a staging area 12, according to the present invention, particularly a hub 12 having a loading/unloading area. The hub 12 includes various parking slots for trailers 18 to be deposited by tractors 16 or other delivery vehicles. FIG. 1 also shows tractor-trailer combination 16, 18, passing into the delivery of system 10 (on the bottom left of the figure) and passing out of the delivery of system 10 (on the bottom right of the figure). A typical gate reader 20 is shown illustratively in this figure beside the entrance and exit locations of the overall hub 12. As will be discussed elsewhere in this application, two gate readers are typically used on either side of an entrance or an exit, in order to allow the system to determine whether a vehicle is leaving or entering the hub 12. In another application of the invention, the delivery vehicles 16, 18, could be a train entering a train yard 12 with a plurality of containers, each with its own RFID tag.

FIG. 1 also shows an information management system 22, which is configured to communicate both with the gate readers 20 and also with devices (discussed elsewhere) used by the drivers (referenced as "drivers' terminals"). These terminals 34 are not shown in FIG. 1 specifically, but are shown for example in FIGS. 3A-3C.

Referring now again to FIG. 2, it is an illustrative block diagram showing the interaction between a typical gate reader 20, the information system 22, and a driver's terminal 34. A communication link 100 is provided between the gate reader and the information management system 22. Specifically, the connection of the link 100 is with the transceiver 28 of the information management system 22.

It should be understood that the link 100 could be either wireless (shown in FIG. 2 as 100) or a "hard" connection such as a direct Ethernet or other hard-wire connection shown in FIG. 2 as 100-H. In the preferred embodiment, the preferred connection is an Ethernet connection 100-H.

A communication link 101 (see FIG. 3B for the moment) is also provided intermediate the information management system 22 and the driver's terminal 34 (which can be a DIAD or other device as discussed elsewhere). Particularly, the connection to the information management system 22 is to its transceiver 28.

Figure 3A:
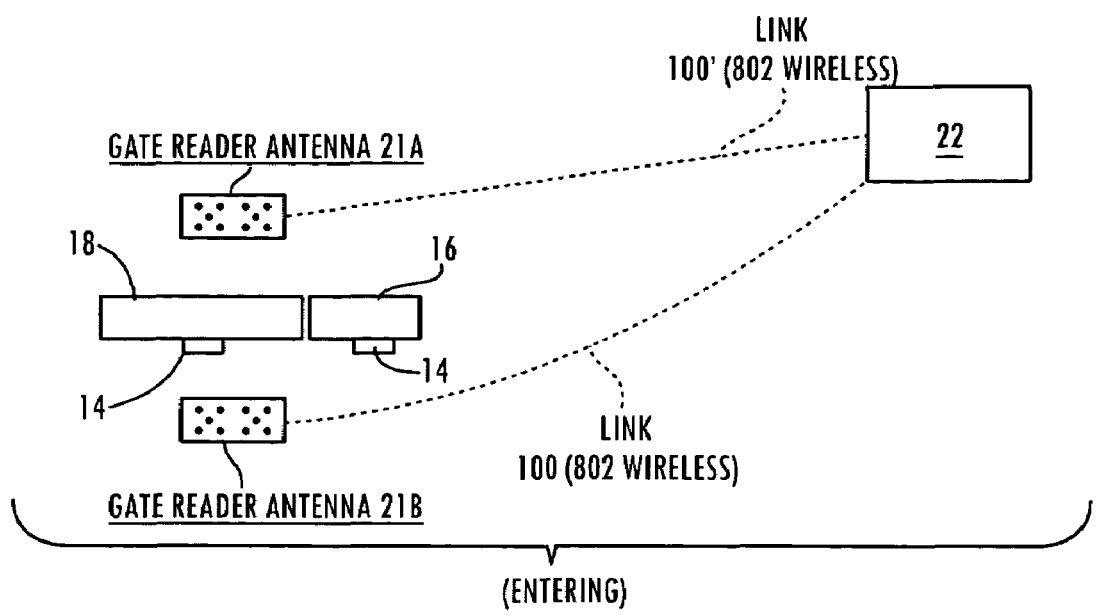
FIGS. 3A-3C are illustrative figures, showing activities upon the entrance of a tractor/trailer combination 16, 18 Into the hub or other staging area.
Figure 3B:
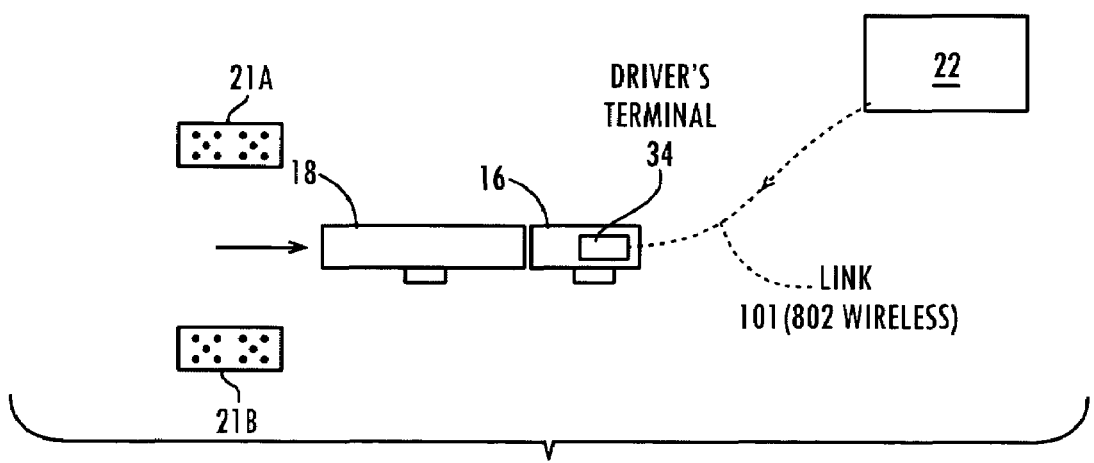
Figure 3C:
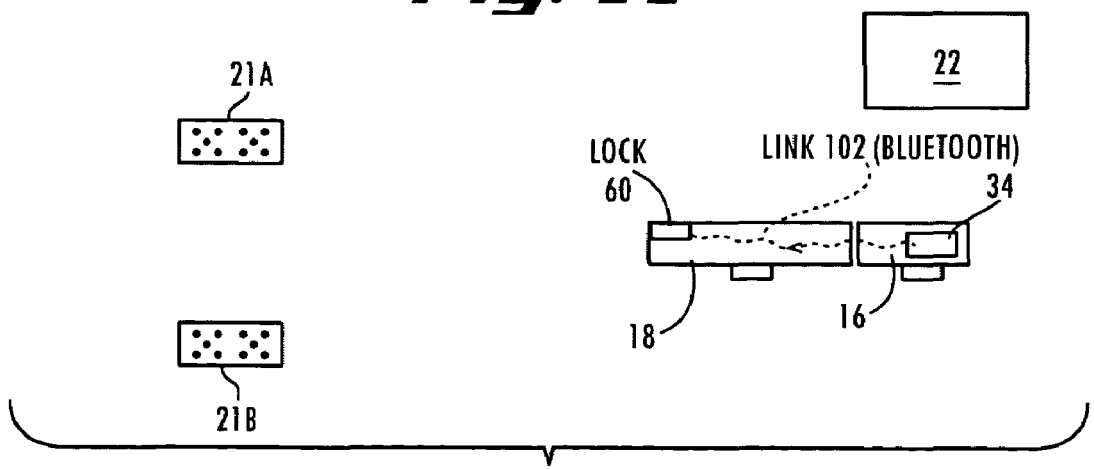

Reference is now made to FIGS. 3A-3C, which are illustrative figures, showing activities upon the entrance of a tractor/trailer combination 16/18 into the hub.

Reference is now made to FIG. 3A, a tractor 16 is shown pulling a trailer 18 into an entrance gate of the hub 12. On either side of this entrance gate are antennae 21A, 21B that are part of the gate reader systems 20. Under the preferred embodiment the gate reader system 20 includes two antennas and one reader, with the reader communicating with an information management system 22 as discussed in detail later. FIG. 1 shows illustratively two gate reader systems 20 directly communicating with the information management system 22.

It may be understood that the determination that the unit is inbound or outbound in one embodiment can be done by recognizing which antenna picks up the signal (while knowing which side of the vehicle the RFID tag is on). This can be recognized by the reader systems 20, or alternately by the information management system 22.

The antennae 21A, 21B, are similar in their operation, in that they are configured to pick up signals from RFID or other tags such as RFID tag 14 attached to each of the tractor 16 and 18. In this case, the RFID elements 14 are attached to the right side of the tractor and the trailer, which is an important element of the invention. This allows the overall system to know whether or not a tractor/trailer combination is entering or leaving through the gate, by determining which of the antennae 21A, 21B, get a reading from the RFID elements 14.

In this case, antennae 21B is getting a reading from both of the RFID elements 14, and is sending a signal through the system 20 through link 100 shown in solid line. It may be understood that, should the trailer exit with this same configuration, the other antennae, 21A will be the one which picks up the signals from the RFID elements 14, the reader will interpret the signal(s), and the system 20 will send a signal through link 100'.

Both links 100, 100' connect to the information management system 22; they are simply shown separately in FIGS. 3A-3C (and FIGS. 4A-4C) as being associated with different antennae for purposes of illustration. In practice, the actual path of the signal along links 100 and 100' will likely be the same, as a single transmission point will be used to communicate to the information management system (whether it be wireless or hard-wired). However an alternate embodiment could include the use of separate readers and communication paths associated with each of the antennae.

The information provided through the link 100 from the gate readers 20 includes information relating to the identity of the tractors and trailers (i.e. the system 10 knows that a tractor and trailer are on or off the property) as discussed elsewhere in the application, and also includes information which will facilitate locking or unlocking of a trailer door lock as discussed later in the application.

It should be understood that the links 100 could be "hard-wired" links such as an Ethernet or other wire connection, or could be wireless connections such as known in the art.

Reference is now made to FIG. 3B. As may be seen in FIG. 3B, the information management system 22 is now sending a signal through link 101 to the drivers' terminal 34. The driver's terminal 34 is typically a portable hand-held computer or other similar processor that can receive and transmit information, and can also process information. In the specific instance of the applicant's configuration, drivers' terminal 34 can be such as known under the trademarks DIAD™ or IVIS. However, other portable apparatuses are contemplated without departing from the spirit or scope of the present invention. It should also be understood that a device could be used that is not handheld and as portable; the device could be relatively permanently attached to the tractor, or could have a cradle that rarely involves disconnection and can engage a hard wire when in the cradle.

In one preferred embodiment of the invention, the link 101 is a wireless link, such as an 802-type wireless link or the like.

Under one embodiment of the invention, by use of the information management system 22, the system has preferably predetermined what the driver's dispatch is, because the information management system 22 knows the driver is coming in. The driver's dispatch, once complete, will sit in an 802 message cue; as soon as the trigger event happens when the RFID tags are read, the information management system 22 transfers the driver's dispatch to the driver (wirelessly through, for example, but not limited to, 802 protocol).

The information being sent through link 101 in FIG. 3B from the information management system 22 to the driver's terminal 34 can include information such as a greeting to the driver, as well as information regarding where the driver should drop off the trailer, and also information regarding where the driver should pick up the next trailer, if applicable. Alternately, the driver could be instructed to park the tractor, unattached to and trailer, at a designated parking location. The driver could also be told to switch tractors. When the driver is done with the delivery side of the dispatch, the driver looks at the dispatch instructions to determine if, when, and where to go get another trailer that is in another bay and is to take that trailer out of the hub to a remote location.

The information being sent through link 101 in FIG. 3B from the information management system 22 to the driver's terminal 34 can also include query-type information which will allow the driver to provide some feedback regarding the condition of the vehicle. This will facilitate improved maintenance of the tractor and the overall fleet. In one embodiment, this is done by querying the driver through the driver's terminal (e.g. "Do you have anything to report regarding machinery malfunction or other concerns?). This encourages DOT compliance.

Furthermore, the information being sent through link 101 in FIG. 3B from the information management system 22 to the driver's terminal 34 can also include information which will facilitate a subsequent communication from the driver's terminal 34 to a locking device, which will be described now in reference to FIG. 3C.

In reference to FIG. 3C, it may be seen that a communication is being made between drivers' terminal 34 and a locking device 60, through link 102. In one preferred embodiment, the link 102 is a wireless link such as a Bluetooth communication, although other wireless or even hard wire communications are contemplated. Under one embodiment, the 802 wireless communications (including the vehicle's own power supply network) from the information management system 22 through link 101 causes the driver's terminal 34 to initiate wireless contact with the locking device 60 by turning on the Bluetooth radio in the drivers terminal 34. Subsequently, initiation and establishment of a Bluetooth (or another suitable wireless) protocol link is provided the data terminal and the locking device in the trailer (by confirmation of correct MAC addresses). This allows the drivers terminal to send signals through link 102 emulating keystrokes to the locking device 60, so as to unlock the locking device 60 as described below by The communication from the drivers' terminal 34 through link 102 to locking device 60 is a communication which facilitates locking or unlocking of the locking device 60. In this case, since the tractor-trailer combination is entering the hub 10, the instruction would typically be to unlock the locking device 60. As will be described elsewhere in this application, the unlocking of the locking device 60 allows for an operator to subsequently manually open the rear door of the trailer 18, without requiring the use of a door seal.

It should be understood that in one embodiment of the invention, software is on the driver's terminal 34, which emulates keystrokes that are required by the locking device 60 (under this embodiment the locking device originated as a device that works with a manual keypad). This process is triggered by some "trigger event" associated with the arrival of the vehicle onto the property, as discussed in detail elsewhere in this application.

As noted above the locking of the locking device can be automatic. However, it should be understood that other possible configurations are contemplated which would allow for the lock to be selectively opened (and/or closed) by the driver alone. Such an instance would be needed to facilitate a DOT inspection on the road, a Homeland Security-type inspection. Such a feature could also be used for simple loading of the unit when not in a hub or sorter location. Such manual unlocks/locks could be logged by the overall system in order to add to security and accountability of all individuals involved.

Under another embodiment, the locking device could be set to simply lock if the door is manually closed.

Figure 4A:
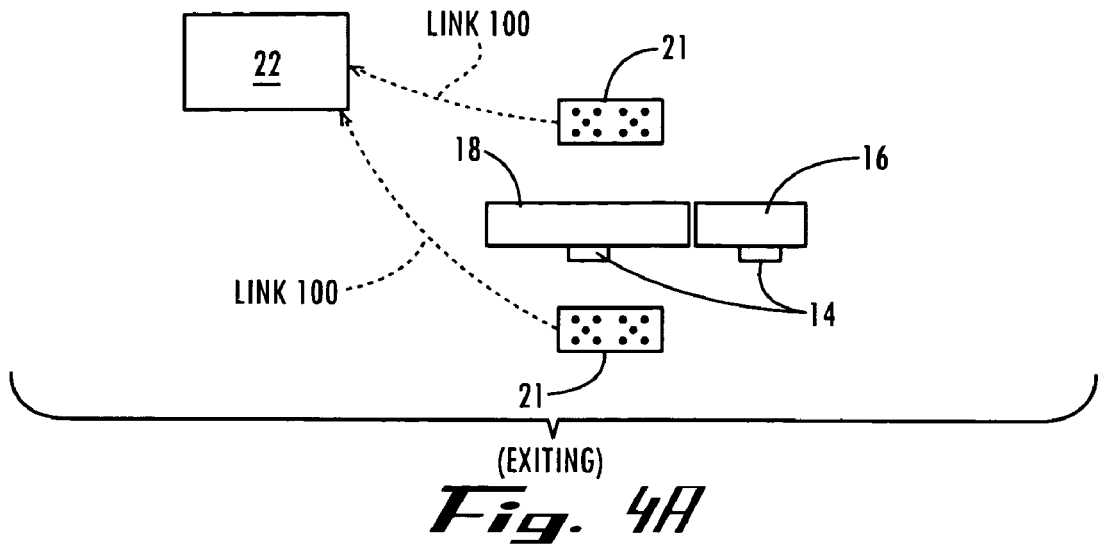
FIGS. 4A-4C are illustrative figures, showing activities upon the exit of a tractor/trailer combination out of the hub or other staging area.
Figure 4B:
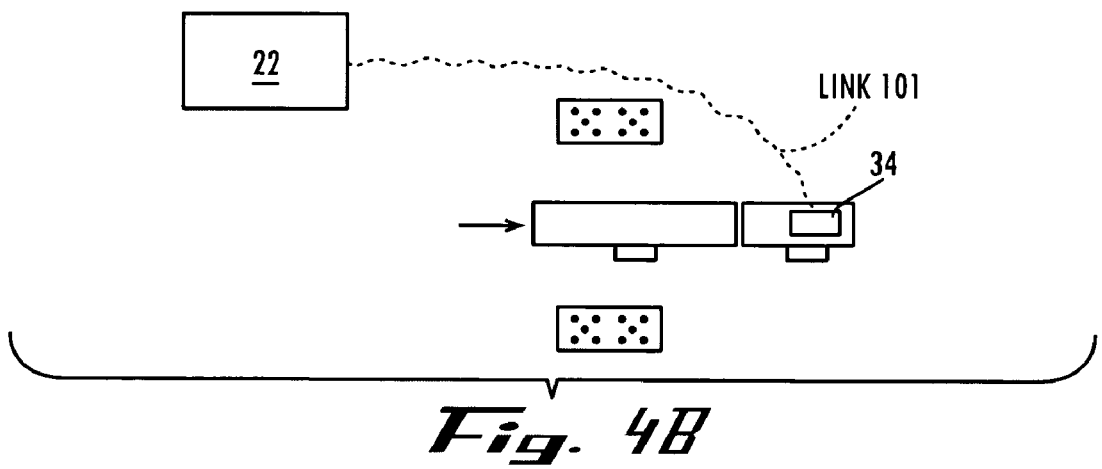
Figure 4C:
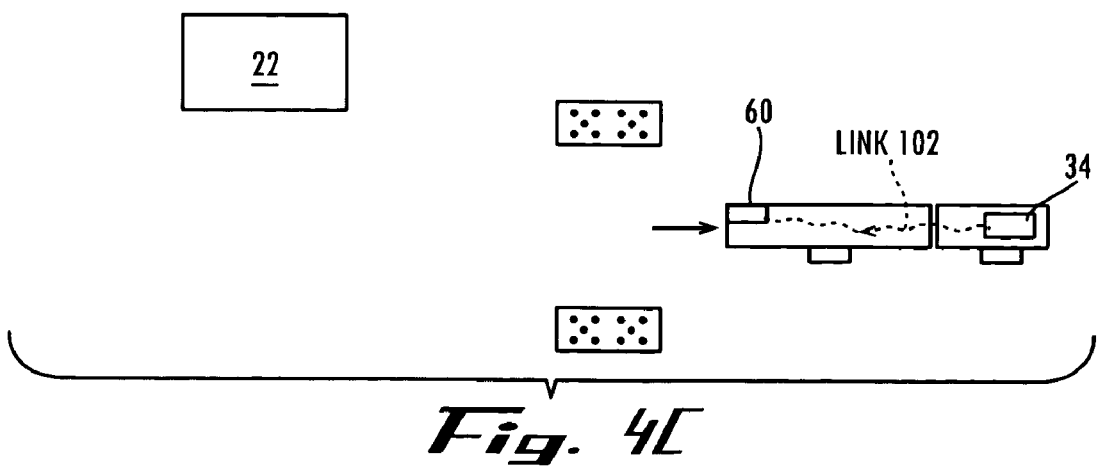

Reference is now made to FIGS. 4A-4C, which are illustrative figures showing a process during which a tractor/trailer combination exits the hub. Specifically referring to FIG. 4A, upon exiting the gate (having antennae 21 on either side), the antennae on the right side of the tractor-trailer combination 16, 18, reads the RFID units 14. Correspondingly, the reader system 20 (see also FIG. 1), identified illustratively by its antennae 21 sends a signal through link 100 to the information management system 22. The information management system 22 recognizes from this signal which antennae (right or left side) picked up the information and therefore can recognize that in this situation the tractor/trailer combination is exiting the hub. Based upon this information, and based upon the information it receives from the RFID units on the particular tractor/trailer combination, the information management system 22 can first check to make sure that the particular tractor/trailer combination is the correct one by use of modules such as 32 in FIG. 2. If it is not, the information management system 22 can send a suitable message along link 101 shown in FIG. 4B, for the driver to turn around and correct matters.

If the tractor/trailer combination is correct, the information management system 22 can send information through link 101 to the drivers' terminal 34 to subsequently provide instructions through link 102 for the drivers' terminal 34 to lock the locking device 60.

Therefore, it may be seen that upon exiting the hub 10, the use of the reader system 20, the drivers' terminal 34 and the locking device 60, along with associated communication therebetween, allows for automatic locking of a trailer door when its associated trailer exits the hub 10.

The Locking Device 60

FIG. 5 is an illustrative view of a tractor/trailer combination, illustrating a tractor 16, a trailer 18, with the tractor 16 having a trailer rear overhead door 19 that opens and closes. The drivers' terminal 34 is shown providing a communication between wireless link 102 to the locking device 60. As noted elsewhere in this application, this communication can include an instruction to either lock or unlock the locking device 60, so that the trailer door 19 can be locked or unlocked, respectively. In one embodiment, a latch 61 moves in and out of an associated slot in the trailer door 19, to provide selective locking and unlocking of the trailer door 19. However, other locking configurations are contemplated within the spirit and scope of the present invention.

In one embodiment, the locking device is provided from "Hoc-Loc", although other alternate locking configurations are contemplated without departing from the spirit and scope of the present invention.

Under one embodiment of the invention, a magnet is used to confirm that the door is in its closed position. If the magnet (which moves with the door) is not situated at a predetermined location relative to the locking device, which means the door is not closed, locking is not possible.

Note that in one embodiment, many components are to be incorporated into single boxes, with a single external antennae extending out of the trailer, to reduce the effect of metal.

The link 102 may be in one embodiment provided by a Bluetooth (or other suitable wireless) protocol link that is first verified and then provides data transmission along link 102. However, as describe below, alternatively, a "hardwire" type system could be used such as on using PLC technology (Power Line Carrier), using the tractor and trailer power lines.

Testing of RFID Capture

In order to evaluate the capture characteristics of the RFID tags 14 as they pass the antennae under various real life conditions, the applicant has conceived as part of the invention the concept of monitoring the weather conditions and the vehicle speed, location, and other characteristics during attempted RFID reading.

A weather station will be used near the site that actually captures one-second data, which includes relative humidity, rainfall, wind speed, wind direction, dew point, and barometric pressure.

A video camera can be used with an infrared module on it that recognizes the tractor coming or going, see how far away from the curb the vehicle is and thus how far away from the antennae the RFID tag is. Speed and location of the vehicle (how far away from the curb he is) will be recorded. Speed will be determined by the use of hash marks on the ground of known spacing, so based on the number of marks the driver passes per second, his speed will be known. In summary, the video is going to tell a user how fast the driver is going, and how far he is from the curb.

At the same time, the testing system of the invention involves collecting one second data from the weather station so when a vehicle is recognized as passing the reader, the overall system will record the temperature, how far off the curb the vehicle was, and at what humidity and rainfall levels.

The video within the system allows a user to note that if the video is triggered and provides a time stamp of a driver driving by, but a tag read is not made, then the system recognizes that there is a problem, whether it be weather related from the data or whether the driver is too far from the curb or whether his tag is bad, etc.

The input to the testing system includes three pieces of input data—one is video by second, one is weather by second, and one is tag read by minute and second. Between all three of those, that will allow the testing personnel to determine at least the following scenarios: 1) tag read by tag reader, driver seen by video, 2) tag not read by tag reader, driver seen by video, 3) tag read by tag reader, driver not seen by video (likely to be a rarity—could be equipment failure). Under situations 1 and 2, the weather conditions may be evaluated to determine how weather, vehicle speed, vehicle location, etc., can affect tag reading.

Use of Geofencing Instead of or in Combination with DIAD Reading

FIG. 6 illustrates a vehicle inventory and dispatch system that includes a "geo-fencing feature" in accordance with an embodiment of the present invention. It should be understood that the present invention could be used in conjunction with a "geo-fencing feature," facilitated by the use of GPS technology in the operator's on-board driver's terminal 34.

Under one embodiment of the invention, a plurality (in this case three) of predetermined "geofences" 99A, 99B, and 99C are set up in the operator's on-board driver's terminal 34, using GPS coordinates. Generally described, the establishment of these geofences allows for an event to be initiated by the operator's on-board driver's terminal 34 when it crosses one of the fences (this is assuming it has a GPS connection), or it can be subject to different business rules depending on whether or not the on-board driver's terminal 34 is inside or outside a particular fence.

In the example embodiment shown in FIG. 6, as noted above, three geofences 99A, 99B, and 99C are set up. This set up can be relatively static, or can be changed as needed.

Under the embodiment shown, the outermost geofence 99A is circular and approximately 10 miles in radius from a selected point proximate the staging area 12, in one case proximate the primary unloading area where unloading of the trailers is provided.

The innermost geofence 99C is likewise circular and approximately 1000 feet in radius from a selected point proximate the staging area 12, in one case proximate the primary unloading area where unloading of the trailers is provided. This distance is of course only exemplary and could be varied as needed. It may be seen that this geofence is not circular, but has been configured to approximate the property line of the staging 12. This allows the GPS unit of the terminal 34 to determine if the unit is "on" or "off" the property. A simple circle could be used if logistically appropriate.

The intermediate geofence 99B is likewise circular and approximately 1000 feet in radius from a selected point proximate the staging area 12, in one case proximate the primary unloading area where unloading of the trailers is provided. This distance is of course only exemplary and could be varied as needed.

It should therefore be understood that it is not critical that the geofences be circular, they can take a variety of shapes (square, rectangular, irregular, etc.,) to adapt to the needs of the particular situation.

An example will now be made of a tractor-trailer combination in an "incoming" mode, approaching the staging area 12. As the tractor-trailer combination 16, 18, crosses the outermost geofence 99A, the driver's terminal (e.g. a DIAD) 34 also enters the zone 99A (by being in the cab of the tractor). The driver's terminal 34 recognizes it is within the zone by monitoring data received from a GPS system included in the operator's on-board driver's terminal 34, as the driver's terminal 34 has been pre-populated with information regarding the geo-fenced area. It may also be understood that the GPS capability is such that the terminal can determine the heading (direction) of the driver's terminal 34, and a confirmation can be made that the tractor is "entering" the area.

Upon crossing the outermost geofence 99A, the driver's terminal 34 initiates wireless contact with the information management system 22, said wireless contact taking many possible varieties, but including an SMS short message service transmission via a cellular connection, a cellular telephone call, or another suitable wireless connection. This contact allows the driver's terminal 34 to collect and transit information such as location, speed, and direction (via the GPS data) to the information management system 22. The information management system 22 can also confirm the identity of the driver's terminal 34 by checking its IP, MAC, or other suitable address as the case may be. This allows the information management system to prepare an 802 message cue (under this embodiment, other wireless protocols may also be used) to be ready to be transmitted to the driver's terminal 34. This message cue can include information needed by the driver to unload the trailer, such as which bay or parking space in which to park the trailer, whether to disconnect from the trailer or not, etc. This message cue (which will be stored on the driver's terminal 34 for review by the driver) can also include other instructions or queries to the driver such as whether the tractor or trailer has maintenance needs, etc. Finally, the message cue can include departure instructions, such as which trailer to pick up from which location at which time, and the destination intended for the trailer.

The message cue can be sent to the driver's terminal 34 as soon as the message cue is complete, which could require cellular use, or could wait until a second trigger event occurs.

The embodiment being currently explained in conjunction with FIG. 6 will use such a second event, and it will be the crossing of the intermediate geofence 99B, which in one embodiment is 1000 feet in radius from a selected point proximate the staging area 12, in one case proximate the primary unloading area where unloading of the trailers is provided. This distance is of course only exemplary and could be varied as needed. Furthermore, in one embodiment of the invention this geofence is set to approximate the property boundaries of the staging area, so the driver's terminal 34 will know when it is on and off the staging area property, and can send an alert to the information management system 22 if certain business rules apply. This can be used to deter theft of driver's terminals 34, and can also be used when the tractor is leaving.

The crossing of the intermediate geofence 99B causes the driver's terminal 34 to initiate wireless contact with the information management system 22 in the staging area 12. Under the current embodiment, 802 wireless connection is used between the two components 34, 22, and the previously discussed 802 message cue is sent to the driver's terminal 34. Again confirmation of the identity of the driver's terminal 34 can be confirmed by the information management system 22 by a check of the MAC address of the driver's terminal 34.

When the driver crosses the innermost geofence 99C another event is triggered by the driver's terminal 34. In this instance the crossing of a geofence causes locking of the locking device 60 (assuming the right heading). As described above with respect to an 802 trigger event in an earlier embodiment, a communication is made between driver's terminal 34 and a locking device 60, through link 102. In this preferred embodiment, the link 102 is a wireless link such as a Bluetooth communication, although other wireless or even hard wire communications are contemplated. Under one embodiment, the geofence crossing event causes the driver's terminal 34 to initiate wireless contact with the locking device 60 by turning on the Bluetooth radio in the drivers terminal 34. Subsequently, initiation and establishment of a Bluetooth (or another suitable wireless) protocol link is provided between the driver's terminal 34 and the locking device 60 in the trailer (after confirmation of correct MAC addresses). This allows the drivers terminal 34 to send signals emulating keystrokes to the locking device 60, so as to unlock the locking device 60. The lock could be automatically locking, locked by one or more keystroke, or locked by other means known in the art.

As noted before, the operator was previously given instructions not only on where to drop off the trailer, but also where to pick up a new trailer and where to deliver it. When the operator has hitched up another trailer (or the same trailer with a different load), the locking device could, under one embodiment, automatically lock. Under a different embodiment, the locking could be done in response to the crossing (with the appropriate heading) of any one of the three geofences described above. In such a configuration, the locking of the door could be a totally autonomous event (not noticed or recorded by the information management system 22). However, under another embodiment, the information management system 22 could be advised of the locking of the device.

WI-Fi Mapping

Yet another technology that can be used in accordance with embodiments of the present invention is wireless fidelity (Wi-Fi) mapping. Generally, as used herein, Wi-Fi mapping refers to techniques that use Wireless Local Area Network (WLAN) technology to determine whether (and where) a given wireless device is within the coverage area of a WLAN. Each such wireless device typically includes a unique media access control (MAC) address, which can be detected by one or more "access points" that monitor for such MAC addresses within the WLAN's coverage area. Furthermore, by using the relative signal strength detected by different access points, such systems can also provide positional information for a given device found to be within the coverage area.

With regard to the present invention, this technology can be used to monitor whether a delivery vehicle (or container), equipped with such a device having a MAC address, has entered (or exited) a staging area 12. Therefore, since Wi-Fi mapping can be used to detect arrival and departure events of delivery vehicles at a staging area 12 (as was performed by the RFID and geo-fencing systems described above), Wi-Fi mapping techniques can be used to trigger the same types of follow-on events described in the embodiments above. Such Wi-Fi mapping techniques can be used in conjunction with, or as an alternative to, the geo-fencing and RFID systems described above.

Alternatives/Options

As noted above, the application of the invention can be made within an environment including tractors, trailers and delivery hubs, but it could just as easily be used in railroad application.

It should also be understood that the wireless connection between the driver's terminal 34 and the locking device 60, could be replaced or supplemented under another embodiment, a "hard-wired" embodiment, which uses PLC technology (Power Line Carrier) such as is used for trucks, by using the power lines within the trucks (typically 12 volt grids).

CONCLUSION

Therefore, it may be seen that the present invention provides an improvement over the prior art by providing an improved system that provides automated, reliable, locking and unlocking of trailers upon leaving and entering the hub, respectively. The invention also provides a method and apparatus for testing RFID or other reading characteristics in a variety of weather environments.

That which is claimed:

1. A method for automating inbound tractor/trailer exchange procedures at a staging area, in which drivers drive tractors pulling detachable trailers in and out of said hub, said trailers having rear doors configured to open and close, said trailers also having locks configured to be selectively locked or unlocked in order to respectively secure or release said rear doors relative to a predetermined position, said method comprising the steps of:
   reading a first identifier stored on a first radio-frequency identification (RFID) tag that is physically associated with a tractor, the tractor being inbound to said staging area and being driven by a driver;
   reading a second identifier stored on a second radio-frequency identification (RFID) tag that is physically associated with a trailer, said trailer being pulled by said tractor;
   sending the first and second identifiers along a first communication link to an information management system;
   transmitting information along a second communications link from said information management system to said driver's terminal, said terminal being within the tractor and accessible to said driver; and
   wirelessly transmitting information along a third communications link from said driver's terminal to a locking device configured to selectively lock and unlock the rear door of said trailer, said transmitting being performed to automatically change said locking device from an unlocked state to a locked state, or from a locked state to an unlocked state, in response to said tractor and said trailer arriving at or departing from said staging area.

2. The method as claimed in claim 1, wherein said driver's terminal is accessible to said driver while sitting in the seat of said driver.

3. The method as claimed in claim 1, wherein information sent along said second communications link includes query information to the driver as to the condition of the driver's equipment.

4. The method as claimed in claim 1, wherein said unlocking of said trailer is automatic upon the transmission of said information along said second link between said information system and said driver's terminal.

5. The method as claimed in claim 1, wherein said wireless transmission of information along said third communications link from said driver's terminal to said locking device is provided by a Bluetooth protocol.

6. A method for automating inbound tractor/trailer exchange procedures at a staging area, in which drivers drive tractors pulling detachable trailers in and out of said hub, said trailers having rear doors configured to open and close, said trailers also having locks configured to be selectively locked or unlocked in order to respectively secure or release said rear doors relative to a predetermined position, said method comprising the steps of:
  reading a first identifier stored on a first radio-frequency identification (RFID) tag that is physically associated with a tractor, the tractor being inbound to said staging area and being driven by a driver;
  reading a second identifier stored on a second radio-frequency identification (RFID) tag that is physically associated with a trailer, said trailer being pulled by said tractor;
  sending the first and second identifiers along a first communication link to an information management system;
  confirming that said first and second identifiers satisfy a preestablished relationship;
  pursuant to said confirmation above, transmitting information along a second communications link from said information management system to said driver's terminal, said terminal being within the tractor and accessible to said driver; and
  wirelessly transmitting information along a third communications link from said driver's terminal to a locking device configured to selectively lock and unlock the rear door of said trailer, said transmitting being performed to automatically change said locking device from an unlocked state to a locked state, or from a locked state to an unlocked state, in response to said tractor and said trailer arriving at or departing from said staging area.

7. The method as claimed in claim 6, wherein said driver's terminal is accessible to said driver while sitting in the seat of said driver.

8. The method as claimed in claim 6, wherein information sent along said second communications link includes query information to the driver as to the condition of the driver's equipment.

9. The method as claimed in claim 6, wherein said unlocking of said trailer is automatic upon the transmission of said information along said second link between said information system and said driver's terminal.

10. The method as claimed in claim 6, wherein said wireless transmission of information along said third communications link from said driver's terminal to said locking device is provided by a Bluetooth protocol.

11. A method for automating outbound tractor/trailer exchange procedures at a staging area, in which drivers drive tractors pulling detachable trailers in and out of said staging area, said method comprising the steps of:
  reading a first identifier stored on a first radio-frequency identification (RFID) tag that is physically associated with a tractor, the tractor being driven by a driver and outbound from said staging area;
  reading a second identifier stored on a second radio-frequency identification (RFID) tag that is physically associated with a trailer, said trailer being pulled by said tractor;
  sending the first and second identifiers along a first communication link to an information management system;
  transmitting information along a second communications link from said information management system to said driver's terminal, said terminal being within said tractor and accessible to said driver; and
  wirelessly transmitting information along a third communications link from said driver's terminal to a locking device configured to selectively lock and unlock the rear door of said trailer, said transmitting being performed to automatically change said locking device from an unlocked state to a locked state, or from a locked state to an unlocked state, in response to said tractor and said trailer arriving at or departing from said staging area.

12. A method for automating outbound tractor/trailer exchange procedures at a staging area, in which drivers drive tractors pulling detachable trailers in and out of said staging area, said method comprising the steps of:
  reading a first identifier stored on a first radio-frequency identification (RFID) tag that is physically associated with a tractor, the tractor being driven by a driver and outbound from said staging area;
  reading a second identifier stored on a second radio-frequency identification (RFID) tag that is physically associated with a trailer, said trailer being pulled by said tractor;
  sending the first and second identifiers along a first communication link to an information management system;
  confirming that said first and second identifiers satisfy a preestablished relationship;
  pursuant to said confirmation above, transmitting information along a second communications link from said information management system to said driver's terminal, said terminal being within said tractor and accessible to said driver; and
  wirelessly transmitting information along a third communications link from said driver's terminal to a locking device configured to selectively lock and unlock the rear door of said trailer, said transmitting being performed to automatically change said locking device from an unlocked state to a locked state, or from a locked state to an unlocked state, in response to said tractor and said trailer arriving at or departing from said staging area.

* * * * *